United States Patent [19]

Repik et al.

[11] 4,380,484
[45] Apr. 19, 1983

[54] INDUCTIVELY HEATED TOOLING AND METHOD FOR WORKING PLASTIC MEMBERS

[75] Inventors: Clyde P. Repik; Alfred F. Leatherman, both of Columbus, Ohio

[73] Assignee: William C. Heller, Jr., Milwaukee, Wis.

[21] Appl. No.: 234,517

[22] Filed: Feb. 20, 1981

[51] Int. Cl.³ .............................................. B32B 31/18
[52] U.S. Cl. .................................. 156/251; 156/272.2; 156/273.7; 156/380.2; 156/380.6; 156/380.7; 156/494; 156/498; 156/515; 156/530; 219/10.53; 219/10.73
[58] Field of Search ................ 156/272, 273, 274, 251, 156/515, 517, 518, 530, 583.1, 498, 380.1, 380.2, 380.3, 380.4, 380.5, 380.6, 380.7, 494, 514, 229, 267; 219/10.53, 10.61 R, 10.67, 10.73; 53/410, 416, 420, 441, 463, 477

[56] References Cited

U.S. PATENT DOCUMENTS

| | | | |
|---|---|---|---|
| 2,710,901 | 6/1955 | Ireland | 219/10.73 |
| 3,245,887 | 2/1969 | Bowen | 156/518 |
| 3,367,808 | 2/1968 | Edwards | 156/272 |
| 3,462,336 | 8/1969 | Leatherman | 156/272 |
| 3,505,149 | 4/1970 | Sanchez | 156/494 |
| 3,632,943 | 1/1972 | Engler et al. | 156/380.6 |
| 3,651,299 | 3/1972 | O'Neill | 219/10.53 |
| 3,808,074 | 4/1974 | Smith et al. | 156/272 |
| 3,933,563 | 1/1976 | Carlisle | 156/515 |

Primary Examiner—Caleb Weston
Attorney, Agent, or Firm—Andrus, Sceales, Starke & Sawall

[57] ABSTRACT

A plastic heating tool unit is provided for cutting, sealing and like working of a relatively thin or film-like plastic element. The tool unit may function to sever a plastic element from a web and create firm thermal attachment thereof to another member. The tool unit includes an appropriately shaped annular or circular tool element formed of appropriate material which is responsive to an inductive field for self-generation of heat within the material. An annular radio frequency induction coil unit is coupled to the tool element. A heat transfer member is secured to the tool element and to a forced cooled heat sink which cools the transfer member and thereby the tool element. The transfer member creates a selected retarded cooling rate of the tool element to provide an improved interaction of the tool member and the plastic element and for more effective heating and cooling thereof. The tool element is forced into operative engagement with the plastic element and by appropriate shaping of the tool element may force a plastic web toward a support and thermally sever the aligned annular portion from the web. The tool unit may be constructed to stretch a film-like plastic web, a foamed plastic web or the like during the thermal cutting thereof, and heat seal the severed plastic element to another member. The tool unit may also seal a preformed cover element to a container assembly in an automated assembly line apparatus having a separate sealing station with a fixed induction coil and a pressure clamp unit moving with the container assembly.

30 Claims, 15 Drawing Figures

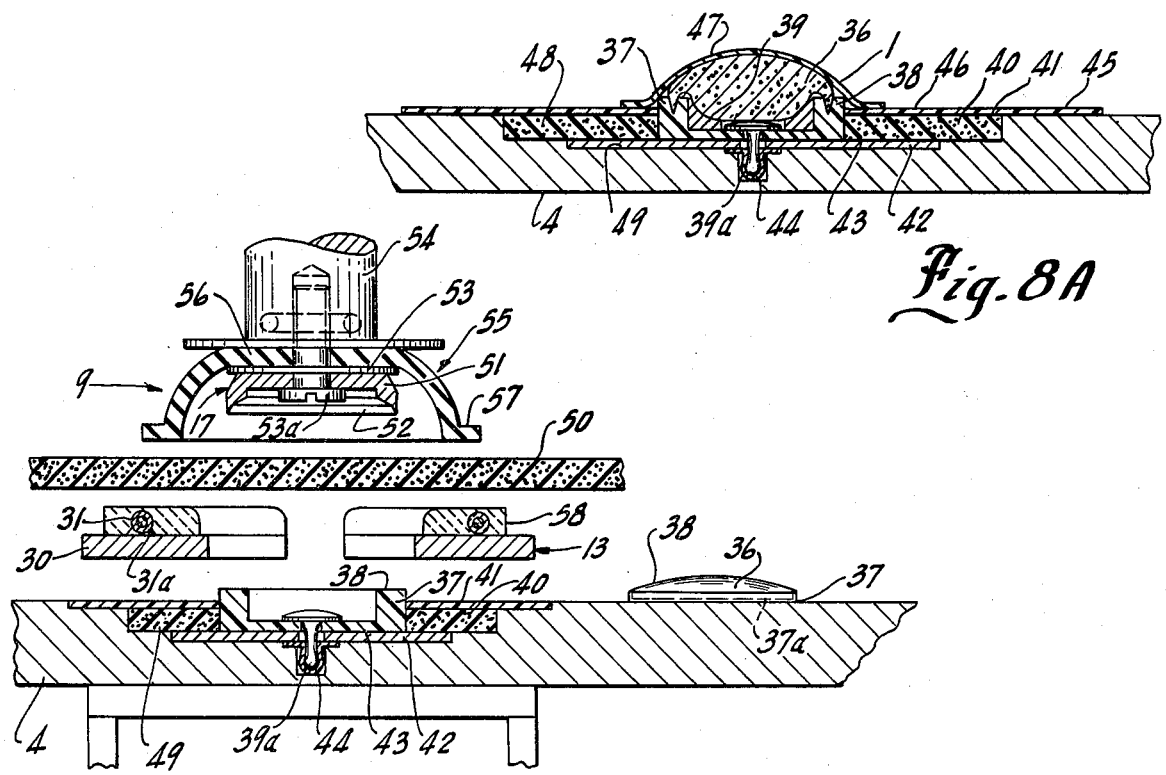
Fig. 8A
Fig. 8
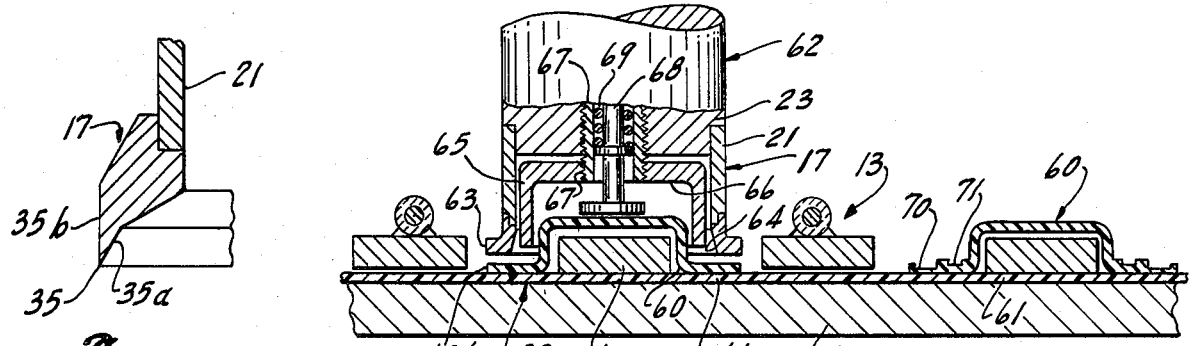
Fig. 7A
Fig. 10
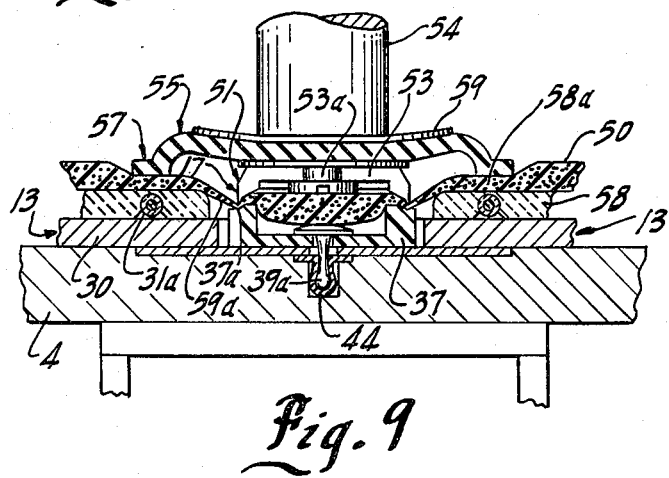
Fig. 9

INDUCTIVELY HEATED TOOLING AND METHOD FOR WORKING PLASTIC MEMBERS

BACKGROUND OF THE PRESENT INVENTION

Plastic elements in the form of films and preformed members are widely used in packaging as well as structural constructions. The plastic member is often conveniently attached to another member particularly another plastic member by a bond, with or without an interposed medium.

The processing and working of plastic materials and elements thus generally involve various cutting, forming, sealing and bonding functions. For example, flat plastic parts may be formed from film-like material by die cutting. Multiple plastic layers and thin plastic films may be attached by applying of heated elements. For example, sealing of plastic objects to each other, particularly with a straight line bond, is often made using a metal wire, or narrow band of material, covered by a protective plastic release layer. The wire-like element is placed in engagement with the plastic layers and an electric current is passed through the element. The current flow results in resistance heating the element and the temperature of the wire increases to a temperature operable to fuse the plastic layer or layers to form a thermal fusion bond. After the necessary time of heating, the current is removed, the joined elements allowed to cool, thereby simultaneously cooling of the plastic to complete the seal or connection. Cutting and joining of layers may also be accomplished employing a heated element. For example, United States Patent 3,441,460 discloses a system wherein the film layers are held between a pair of clamping jaws. A resistance heated knife is moved downwardly between the clamping jaws into engagement with the plastic film. The knife functions to simultaneously sever the plastic layers by melting thereof and creating an interconnecting plastic bead on the severed edges.

Another significant method of bonding plastic elements in the use of inductive heat generation in the plastic elements. For example, the present inventor is active in the development and application of a unique inductive heating method using particulate material embedded within one or more plastic elements and which responds to a high frequency magnetic field to create heat within the element as the result of hysteresis losses. The hysteresis loss method rapidly heats the plastic to the level necessary to create a firm and reliable fusion bond. Other forms of inductive heating of the plastic member have also been suggested for bonding. For example, U.S. Pat. No. 3,909,326 discloses a method of attaching a film cover to one end of a tubular member, such as an open-mouth container. In such system, the packaging or covering member includes a metallic film having a heat sealable material on one surface which is held in firm engagement with the open edge of the container. The covered container is moved past an induction heating coil which activates the metallic film through inductive effects to generate heat within the sealing member of an appropriate level to melt the heat sealable material and heat seal the member to the container. The prior art has even suggested the use of ultrasonic systems for attaching one plastic film member to another member; for example, as shown in U.S. Pat. No. 3,970,490 which issued July 20, 1976.

The above and similar teachings have been suggested but there remains a need for a reliable method of working thin plastic films and plastic members for cutting and/or sealing to another member, and eliminating the need for expensive heat generating material such as aluminum foil in the assembly.

SUMMARY OF THE PRESENT INVENTION

The present invention is particularly related to an inductively heated apparatus for working and processing plastic elements, and in particular cutting, sealing and like working of a relatively thin or film-like plastic element to create firm attachment to another member. Generally in accordance with the teaching of the present invention, the apparatus includes a tool unit having an inductively heated cutting and/or sealing end surface and includes a forced cooling means for controlling conduction of heat from the working end surface of the tool unit. The cooling is preset in relationship to the plastic material and cycling to provide an unexpected satisfactory and effective means of operating various tool units for purposes of cutting, sealing and the like. This invention has been found to provide effective, rapid and reliable release of the tool working surface from the plastic member while permitting rapid cycling.

In a preferred embodiment of the invention for forming of disc-like elements and the like, the tool unit consists of an appropriately shaped annular or circular tool member formed of appropriate material which is responsive to an inductive field for self-generation of heat within the material of the tool member. The tool member is secured to a heat transfer member which is coupled to a forced cooled element which cools the transfer member and thereby the tool member. The transfer member as well as the cooled element permits cooling at a selected retarded rate and provides for the desired interaction of the tool member and the processed plastic which creates effective heating of the tool and the plastic while cooling the tool for release purposes, thereby permitting a desired cycle time.

In accordance with a further feature of one embodiment of the present invention, the tool is specifically constructed for attaching a film-like plastic member in overlying relationship to another base member or article, or other similar application. In this embodiment, the tool unit is forced downwardly onto a stretched film-like plastic member which forces the plastic sheet downwardly to the base member. The tool unit includes an inductively activating unit coupled to the tool element and activated to inductively heat the tool element which functions to simultaneously thermally sever the aligned portion from the film-like plastic sheet and seal it to the opposed base member. The film sheet is placed under tension during the severing and promotes a clean separation of the aligned portion. The same tool unit can of course be appropriately applied to preformed member for sealing thereof to an opposed member.

In using the regulated cooled tooling, the inventors have further found that optimum and unusually satisfactory and unexpected results are obtained by initiating the cycle with the tool significantly below the fusion temperature. The tool element is inductively activated to rapidly raise the temperature of the tool substantially above the fusion temperature of the plastic film, where it is held at least momentarily, then deactivated and rapidly cooled below the fusion temperature. The induction heating and cutting assembly may in one embodiment include a support plate with an opening through which the tool unit moves. A loop coil is intimately attached to the plate and connected to a suitable high frequency source of power. The plate is formed with a radial slit or opening to form a discontinuity such that the high frequency current flows in a loop pattern in the periphery of the opening. The high frequency current creates an induced current in the adjacent working end of the tool unit. Magnetic and ohmic losses in the tool element generate selfheat within the tool. By appropriate design and excitation, the tool element can be held at a steady but elevated temperature or suddenly increased in temperature over a closely controlled time period, thereby adapting the tool unit for various forms of processing and work.

It has also been found desirable in the construction of the tool to appropriately shape the end of the working tool to provide an appropriate mass for heat transfer while maintaining an appropriate working end to provide the necessary heat and cooling during each processing cycle. The tool element may be advantageously constructed having a larger lateral working end than the heat transfer element. The enlarged lateral end is then closely spaced to the inner peripherial surface of the opening in the inductively heating assembly which concentrates the inductive energy within the working end of the tool and establishes a more rapid increase in the excitation, and therefore the temperature, of the tool element.

The cutting tool unit of the invention might also be advantageously applied to die cutting. Thus, the tool unit may be moved downwardly forcing a plastic film into engagement with a backing support to rapidly, thermally sever the film. The engaged tool unit is then rapidly cooled so as to be readily removed or separated from the cut plastic film without significant tendency of the plastic to adhere to the tooling.

The tool unit preferably includes a heat transfer element having a high thermal conductivity, such as a copper element, connected to a cooled element such as a forced cooled plate. The heat transfer element is not significantly heated by induced current because of its good electrical conductivity but establishes appropriate controlled transfer of the thermal energy from the working portion of the tool unit. The cooled element may advantageously be a nonmagnetic stainless steel which has a magnetic or resistance characteristic to retard significant heating by induced current but also having a sufficiently low thermal conductivity to maintain an appropriate heat sink for controlled removal of heat from the transfer element. Such selection and design contributes to concentrating the induction heating effect within the working end of the tool unit to provide efficient transfer and usage of the energy.

These and similar advantages of the invention as set forth in the above general discussion of the more significant features of the present teaching will be more fully understood from the following description of preferred embodiments of the present invention. The present invention provides a highly improved inductively heated sealing and/or cutting tool unit for hot working of a plastic element. The structure of the invention may employ commercially available components and technology for commercial, on-line production with high speed, reliable cutting and/or sealing of plastic elements. The structure may therefore be constructed at an economically acceptable cost level.

DESCRIPTION OF THE DRAWING FIGURES

The drawings furnished herewith illustrate preferred constructions of the present invention in which the above advantages and features are clearly disclosed as well as others which will be readily understood from the following description.

In the drawings

FIG. 7a is a fragmentary enlarged view of a modified tool end;

FIG. 8 is a view similar to FIG. 3 illustrating a modification of the apparatus for applying a foam cover to a cup-shaped member of a body electrode;

FIG. 8a is an enlarged cross-sectional view of the electrode formed with the apparatus shown in FIGS. 8-9;

FIG. 9 is a view of the apparatus shown in FIG. 8 with the tool unit in the cutting and sealing position;

FIG. 10 is a view similar to FIG. 3 illustrating a modification of the invention for applying a preformed cap to a base support;

DESCRIPTION OF THE ILLUSTRATED EMBODIMENT

Generally, the drawings furnished herewith illustrate various features and embodiments incorporating the teachings of the present invention wherein an inductively heated apparatus is provided for the cutting and-/or sealing of one plastic member to a second member which will generally be of a similar, and at least, a compatible material for heat sealing or joining thereof. The several elements may be single elements, multiple layered elements or the like. The present invention is thus particularly directed to the method and apparatus for applying of heat sealable material or member to another member in a rapid manner and in a more or less production line installation.

Figure 1:
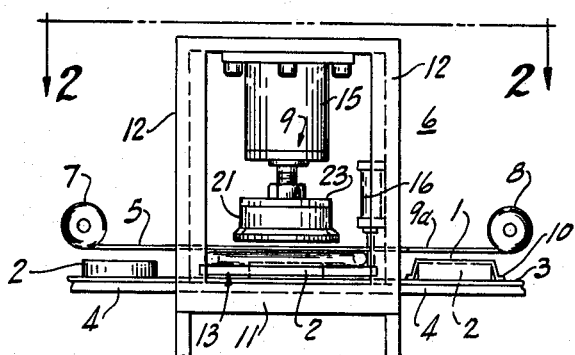
FIG. 1 is a side view of a diagrammatically illustrated induction heating apparatus for cutting and sealing a plastic film member to a base support with parts broken away and sectioned to show detail of construction.
Figure 2:
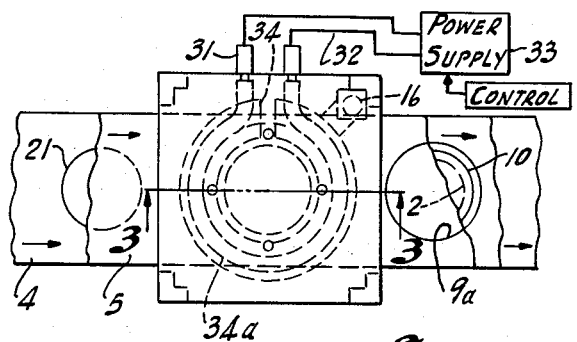
FIG. 2 is a top view of the apparatus shown in FIG. 1.
Figure 4:
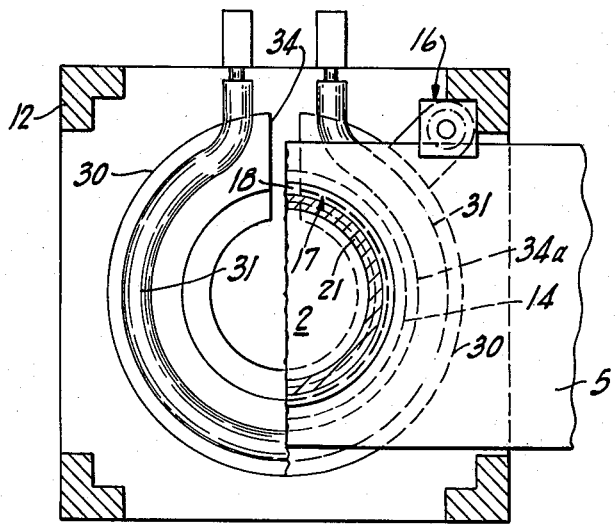
FIG. 4 is a horizontal cross sectional view of the cutting and sealing element shown in FIGS. 1-3 and taken generally on line 4—4 of FIG. 3.
Figure 5:
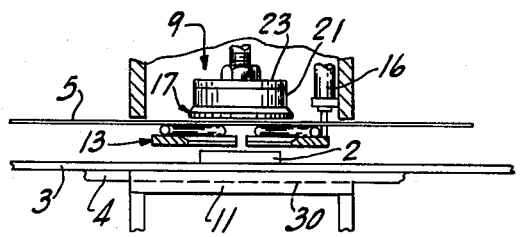
FIG. 5 is a reduced view similar to FIG. 3 illustrating a step in the sequence of a cutting and sealing operation.

Referring particularly to FIG. 1, an embodiment of the invention is illustrated wherein a thin film cover 1 is secured overlying an article 2, supported on a base 3. The peripheral portion of cover 1 is sealed to the base member 3 for protective enclosure of article 2. In the illustrated embodiment of FIGS. 1 and 2, a conveyor 4 is provided for supporting a series of spaced base members 3, each of which supports an article 2. The conveyor 4 moves relative to a film strip or web 5 from which successive film covers 1 are formed. Conveyor 4 particularly provides for sequential positioning of the article-loaded members 3 and the film web 5 in selective alignment within a cutting and sealing apparatus 6, which is constructed in accordance with the teaching of the present invention. The film supply is illustrated as including a web 5 of indefinite length of the film material which is supported between powered feed and take-up rolls 7 and 8 to form an aligned film web 5 under tension within apparatus 6. Cutting and sealing apparatus 6 includes a vertically reciprocal tool unit 9. An induction heating coil unit 13 is coupled to tool unit 9 to heat the working end of the tool unit 9. The tool unit 9 is adapted to move downwardly through the film web 5 removing a portion thereof to define the film cover 1 and leaving a hole or opening 9a within the aligned portion of the film web 5. Thus, the uncut scrap portions about hole 9a maintain the longitudinal integrity of the web 5 for movement through the apparatus 6 to the take-up roll 8. The tool unit 9 functions to force the film web 5 downwardly over the article 2 and the heating coil unit 13 is activated to cut the cover 1 from the web 5 and to form a fusion or thermal seal 10 in the peripherial edge portion of film cover 1 to the base member 3. The seal 10, as illustrated most clearly in FIG. 2, is an encircling seal to effectively completely enclose article 2, but may of course be otherwise formed; for example, with multiple spaced seal portions.

Figure 3:
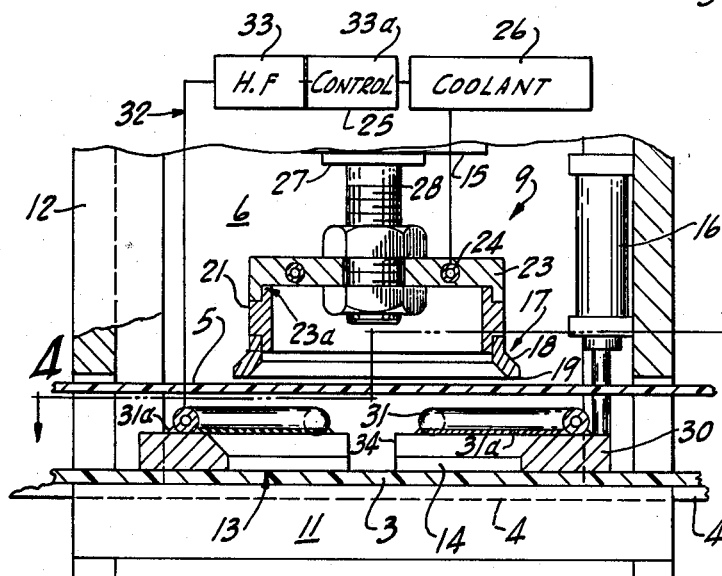
FIG. 3 is an enlarged vertical section of an apparatus shown in FIGS. 1 and 2 and taken generally on line 3—3 of FIG. 2.

Referring to FIG. 3, a suitable cutting and sealing apparatus 6 is shown in section and includes a supporting structure including a base plate 11 over which the conveyor 4 passes with the base members 3 located thereon. The supporting structure is of course adapted to be mounted in any suitable location and provides for horizontal movement of the conveyor 4 therethrough. In the illustrated embodiment, the conveyor 4 and web 5 move parallel to each other, and are diagrammatically shown as such devices can be of any suitable construction and readily provided. Conveyor 4 is shown as a belt-like unit which moves through apparatus 6 for loading and unloading the base members 3 with articles 2, as shown in FIGS. 1 and 2, thereon for simplicity of illustration.

A head assembly 12 is secured in overlying relationship to the supporting base 11 and supports the tool unit 9 for vertical reciprocal movement toward and away from the supporting base. The induction heating coil unit 13 is separately supported on the head assembly 12. Unit 13 is an annular assembly having an opening 14 through which the tool unit 9 is moved. A conventional power cylinder 15 is coupled to the tool unit 9 and a similar power cylinder 16 is secured to the induction heating unit 13 for selective vertical positioning of the structure, as more fully described hereinafter.

More particularly, as shown in FIG. 3, the tool unit 9 is a three piece assembly which in the illustrated embodiment of the invention is constructed to provide a round cut for removing the film cover 1 from the web 5. Tool unit 9 includes an annular cutting and sealing element 17 which functions to cut the plastic film cover 1 from web 5 and then seal the cover 1 to base 3 overlying article 2. For example, plastic film or web 5 is typically a low-density polyethylene and the base member is formed of a compatible plastic such as another polyethylene or provided with a similar coating. The tool element 17 is shown as a solid ring which is formed of a suitable material for responding to a high frequency electromagnetic field created by induction heating coil assembly 13. The element 17 may be a ferromagnetic metal such as a martensitic tool steel which is commercially available by the identifying number H-11 alloy. The described material of element 17 thus is such that in a presence of an electromagnetic field, RF currents flow within the metal, the resistance of which is such that ohmic and magnetic losses appear as heat. Ordinary carbon steel has been used but does not have the durability of tool steel.

The ring element 17 is generally L-shaped with an outwardly projected working leg or end 18. The outermost portion is formed to define a reasonably sharp cutting edge 19, which may be a slightly flat edge to increase the seal area of seal 10. The opposite side walls or faces of the leg 18 are chamfered to gradually separate from the cutting edge 19. The bottom wall or face particularly is tapered or angled slightly to the horizontal. Angles of 10 to 15 degrees have been used with satisfactory results. An outer stepped projection might also be used. Thus, the face of the element is preferably closely spaced to the coil unit to concentrate the heat in the outer end. For example, an RF generator having 2.5 kW output was connected to energize the several coils of three tool units in series. The movement of the tool unit 9 downwardly through the film web 5 results in the cutting edge 19 moving into engagement with the film web 5. The continued downward tool movement forces web 5 downwardly toward the base member 3. At a predetermined time, the power supply is energized to heat the cutting element 17 which results in a thermal severing of film web 5 and formation of cover 1, including the formation of the seal 10 to secure such severed cover 1 to base member 3.

An annular heat transfer member 21 is secured to the upper end of the annular cutting element 17. The annular heat transfer member 21 is shown as a tubular element having a reduced coupling portion projecting in closely overlapping relationship to the inner upper end of the annular cutting element 17. The heat transfer member 21 and element 17 are intimately joined as by silver soldering or the like. The above junction creates a good thermal transmitting junction and establishes a repeatable controlled heating and cooling of the cutting element 17.

The thermal transfer element or ring 21 can be formed of any suitable material which establishes the desired relatively rapid heat transfer. Copper is particularly desirable because it provides good heat transfer and has a very low electrical resistance such that ohmic losses are minimum. The transfer element 21 is therefore not heated significantly by induced currents when in the field of the induction heating coil assembly 13.

A cooled plate 23 is similarly intimately joined to the upper end of the heat transfer member 21, as at 23a. Plate 23 is illustrated as a flat plate member having an undercut portion telescoped into the outer end of the heat transfer element 21 and preferably similarly connected as by a silver soldered joint. The plate 23 is formed of a suitable heat transfer material and preferably a material which has a relatively low resistance such that in the high frequency field, excessive heat is not generated. For example, an austenitic stainless steel which is commercially available as a 304 alloy provides a satisfactory material. Although the resistance of such steel is not particularly low, the material heats relatively slowly in the RF field, particularly as compared to the magnetic steel used in the cutting element 17.

The firm mechanical and bonded contact including the silver soldering or the like is desirable to establish efficient and predictable rates of heat transfer through the heat transfer member to the cooled plate, thereby permitting reproducible and predictable operation of the tool unit 9.

Plate 23 is coupled to a suitable cooling unit 24 such as a serpentine cooling tube embedded therein. The cooling tube 24 is connected by suitable flexible leads 25 to a coolant source 26 for establishing controlled heat transfer from the cutting and sealing element 17.

The three-piece tool unit 9 is suitably secured to the power cylinder unit 15 for vertical positioning. The tool unit 9 is shown connected to the piston rod 27 of the cylinder unit 15 as by a connecting bolt 28 which passes through the cooled plate 24. The power cylinder unit 15 includes a fixed cylinder connected to the head support assembly 12. A piston, not shown, within the cylinder is connected to the piston rod 27 which projects downwardly to the bolted connection to the tool unit. The power cylinder unit 15 is coupled to a suitable pressurized fluid supply for power positioning of the tool unit 9 with respect to the base plate 11.

The induction heating coil unit 13 is mounted for selective activation and for positioning simultaneously with the movement of cutting element 17 for proper excitation of the element 17. The illustrated induction heating unit 13 includes a support ring 30 in the form of a plate-like member defining the central opening 14 which is aligned with the tool unit 9. Ring 30 is coupled to the power cylinder unit 16 for selective vertical positioning with respect to the tool unit 9 and particularly the cutting and sealing element 17. A single turn cooling coil 31 is secured to the top wall of the support ring 30 and encircles the opening 14 in the support. The opposite ends of coil 31 are as diagrammatically shown, connected by suitable power leads 32 to a high frequency power supply 33. A timer and sequence control 33a is shown connected to the coolant supply 26 and power supply 33 to establish timed operation thereof. Control 33a would also operate the positioning means 15 and 16 for the appropriate movement of the elements, such as hereinafter described. The support ring 30 is formed of copper or other highly electrically conductive material. The cooling coil 31 is soldered or otherwise intimately attached to the support ring 30 by silver soldering or the like, as at 31a. The cooling coil 31 is a metal tube which carries cooling water as well as the energizing current from the power source 33, which current transfers to and from the ring 30 at the ring connection. The support ring 30 includes a radial gap or slit 34 generally located between the power leads 32 to the cooling coil 31. The slit 34 prevents circulation of the current and forces the current to flow in a loop pattern 34a generally in accordance with the split ring 30, with the current concentrated in the area of opening 14.

The supply or source 33 may be any suitable high frequency or radio frequency supply. Typically, with a power source 33 of operating frequency of approximately 4 megahertz, and with the illustrated construction, the current will tend to flow in the pattern uniformly distributed about the inside diameter of th opening 14. Although the operating frequency is not critical, a more uniform pattern was noted with the higher frequency. Generally, 1.5 MHz has been found to be a useful frequency for practical application. Substantially higher frequency up to 30 MHz will theoretically operate.

With the cutting element 17 and particularly the leg 18 aligned with the support plate or ring 30, the RF current in the support ring 30 induces corresponding RF current in the adjacent working face of the tool element 17. The induced current produces ohmic and magnetic losses within the tool element 17 and particularly leg 18, resulting in heat generation therein. The heat level generated is dependent upon not only the frequency of supply 33 and the material of the element 17 but also the relative tool dimensions and the velocity of heat transfer or loss of heat through the heat transfer element 21 to the associated cooled plate 23. The factors can be readily controlled in the design of the apparatus and may be designed to vary the heat characteristic. Thus, by varying the level of the excitation current applied to coil 31 the cutting element 17 can first be held at a relatively low and steady but somewhat elevated temperature, can secondly be excited to suddenly increase the temperature above the ambient or steady state level. The variation may be created over a closely controlled period and held for the necessary period to properly work the film cover 1. Similarly, rapid or slow cooling of the tool element 17 may be created as a result of the deenergization of the coil 31 and the controlled cooling of the cooled plate 23 and the heat transfer member 21. The tool element 17 and particularly edge 19 is sufficiently cooled prior to raising of the tool unit 9 to insure clean release of the tool element 17 from film cover 1.

The tool unit 9 is thus preferably specially constructed to confine the induction heating action of the RF field to the cutting element 17 and particularly the working portion 18-19 to establish the most efficient use of the energy. The increased diameter of the working portion 18 of the tool element 17 in relationship to the other portions of the tool unit 9 tends to concentrate the energy in the working portions of tool element 17 more closely adjacent to the induction heating coil assembly 13. This tends to concentrate the RF field in the enlarged portion and further removes the field from the transfer member 21. The field is thereby primarily placed within the working portion 18 where it is useful and removed from the heat transfer member 21 where the heat created would dissipate as wasted energy and interfere with the function of heat transfer element 21 during the cooling period after removal of the RF field. The working surface of the cutting element may be covered with a suitable release material, such as that sold under the trademark "Teflon" or other suitable material, not shown. Such material, however, has a tendency to wear rather rapidly and may require periodic replacement. Other releasing systems might also be used. For example, a light application of silicone grease applied to the working face periodically, such as once a day, can further insure a film-free clean release of the tool element.

Althought the present invention may be applied to any form or any materials suitable for fusion and thermal attachment to another member, the apparatus has been found to produce unusually satisfactory attachment of the polyethylene film to a base member having a facing coating of polyethylene or an olefinic resin coating.

A preferred cutting and sealing sequence is described with respect to the apparatus shown in FIGS. 3, 5, 6, and 7, as follows. The cutting and sealing tool unit 9 is initially in the fully open position, shown in FIG. 5. The film web 5 is positioned with a continuous portion between tool unit 9 and an aligned article 2. After location of article 2 in place, the cylinder 16 may be operated to move the induction coil unit 13 downwardly adjacent to or on the conveyor 4. Alternately, in an actual mode practiced, the coil unit 13 and the tool unit 9 were simultaneously moved downwardly, as presently described.

Figure 6:
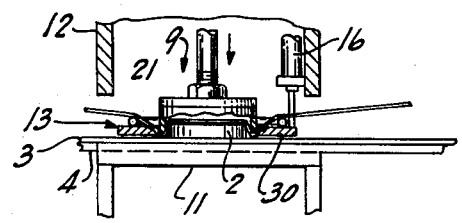
FIG. 6 is a view similar to FIG. 5 showing the sealing position of the apparatus.

Power cylinder 15 is actuated to move the tool unit 9 downwardly with the cutting element 17 moving into engagement with the aligned portion of the film web 5 and simultaneously the power cylinder unit 16 is actuated to lower the induction heating coil unit 13. The induction heating coil unit 13 is energized just prior to or simultaneously with the forcing of web 5 onto base 3, as shown in FIG. 6 to provide rapid inductive heating of the cutting element 17, which rapidly heats at least the working edge or land 19 (FIG. 3) preferably above the melting temperature of the film web 5. The working edge 19 thus thermally severs the cover 1 from web 5 and forces the peripherial edge portion downwardly onto the base member 3 with the film cover 1 overlying the article 2. The force with which the cooled element 17 forces the cover 1 to the base 3 is not critical. The force is preferably sufficient to remove any distortion or wrinkles which might develop in the film web 5 during its movement and further to stretch the film cover 1 over the article 2. The total encirclement of the tool element 17 over the severed film cover 1 tends to heat the film material, resulting in the smooth stretching and conforming of the material over the article 2 thereby producing a wrinkle free cover. Thus, in addition to providing a highly effective seal, the apparatus may provide a uniform and smooth cover which is esthetically pleasing.

Figure 7:
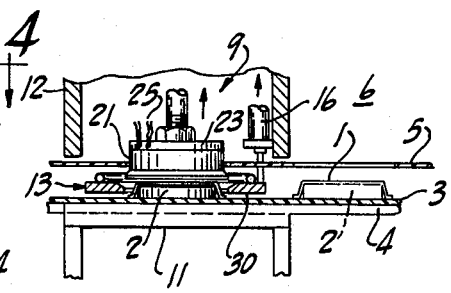
FIG. 7 is a view showing the apparatus moving into the release position after completion of the cutting and sealing step.

Tension is preferably formed in the film web 5 during the severing and sealing cycle which is sufficient to pull the film web from the severed film cover 1 and allow return of the web 5 to the horizontal position as shown in FIG. 7. The stretching of the web 5 of course also contributes to a clean, sharp and complete severing of the film cover 1 from the web 5. After a short dwell sealing period, the tool unit 9 and induction heating coil assembly 13 are raised from the base member 3 and the conveyor 4 actuated to move the base member 3 with the attached film cover 1 from alignment with the tool unit 9. The covered article is replaced with an uncovered article and conveyor 4 again moves to align the new uncovered article 2 and base member 3 within the apparatus 6 and the cycle is repeated.

Although any functional temperature sequence can be used, the inventors have found that unusually satisfactory and surprising results are obtained by starting with the tool end 18 below the fusion temperature of the plastic film 5, and may be conveniently cooled to normal room temperature of approximately 70 degrees. After contact with the film, energy is supplied to create a rapid rising temperature in the cutting element 17. The temperature rises above the temperature necessary to sever the cover 1 from the web 5 and thermally fuse and seal the cover 1 to the base 3 under some pressure. While the cutting element is in pressurized sealing engagement with the cover 1, the high frequency power supply is rapidly decreased or removed. This terminates heating of cutting element 17 and establishes a controlled but rapid transfer of the heat from the element 17 via heat transfer member 21 to the heat sink plate 23. After a short cooling period, the cooled ring end 18 and particularly edge 19 can be readily removed from the film cover 1 without any tendency for the film cover 1 to adhere to the cooled cutting element 17. 17.

For example, in a practical sequence for applying the polyeythelene film to a base member 3 having a polyeythelene coating, the cycle time included a period of less than one second to move the tool unit 9 and the heating coil assembly 13 downwardly into alignment and clamping position. One to four second cutting and heating periods were used and completely severed the film cover 1 from the web 5 and firmly sealed the film cover 1 to the base member 3. Stretching of the film web 5 during the period the tool element 17 moves downwardly contributes to a clean, sharp and complete cutting of the web cover 1 from the web, which then returns to the planar position, as most clearly shown in FIG. 7. Two to four second cooling periods were created, after which the tool unit 9 and heating assembly 13 were raised, with the tool element working edge 19 moving from cover 1 with a complete film-free separation.

Although shown with the induction heating coil assembly 13 located beneath the web 5, the assembly may be above the web, but such an arrangement does not provide for convenient release of the film web as shown in FIG. 7. This may also create some softening of the adjacent film web and increase the transfer time of the conveyor 4 or the film web 5 during each complete cycle.

Although described with a particular inductive heating wherein a current is induced in the tool element 18, other forms of remote or induced heating may be also used. The present invention can also be applied to other materials and in other embodiments.

The tool element 17 is of course shaped in accordance with the particular cutting and/or sealing function involved. For example, FIG. 7a illustrates a tool end which has been applied to a cutting and sealing tool element. The tool element 17 in FIG. 7a has a relatively pointed cutting edge 35 with the inner bottom wall 35a inclined at approximately 45 degrees while the outer wall 35b is inclined at a much lesser angle to the vertical. The tool element of FIG. 7a has been particularly applied to cutting and sealing a foam pad member of a large dispersive body contact electrode in place by the simultaneously pressure engagement and heating with a foam web to thermally sever and then seal a severed pad member. Although the tool unit is shown having an annular cutting end member and a separate tubular heat transfer member, other constructions may of course be made within the teaching of the present invention.

A second embodiment of the invention is illustrated in FIGS. 8-9, inclusive, which is particularly directed to a procedure and apparatus for attaching a smaller foam cover or pad 36 to a cup-shaped body 37, and particularly with the edge of the pad fusion bonded within a recess 37a in a flat outer opening wall 38. The illustrated product of the second embodiment is shown in FIG. 8a, and is a uniquely formed pre-gelled body contact electrode, such as widely used for attaching of electrical instrument leads to a human body as a part of a medical diagnosis. The apparatus of the second embodiment is generally similar to that of the first embodiment. For purposes of simplicity and clarity of explanation, like elements of the two embodiments are identified by corresponding numbers, and such common components are not again described in detail in connection with the second embodiment. The pre-gelled body contact electrode is shown including the main cup-shaped plastic body 37 which serves to retain an electrically conductive gel 39. The gel 39 fills the cavity of the cup-shaped body 37 and saturates fully or partly the foam pad 36 such that functional amounts of gel are dispersed throughout the pad, so as to provide satisfactory electrical continuity to a human body skin surface when the electrode is located in abutting relation to the skin. The body contact foam pad 36 is secured over the open end of body 37, and projects partly into the body cavity, as more fully described hereinafter. A metallic contact member or rivet 39a is secured within the base of the body 37 and creates a low resistance electrical path from the gel 39 to the exterior of the electrode for connection to an appropriately shaped external connector, not shown. The external connector connects the electrode to an appropriate circuit.

The electrode assembly is suitably held in place at a desired location on a patient's body by an attachment means. A typical means, shown in FIG. 8a, includes an attachment foam washer 40 having an exterior pressure-sensitive adhesive coating 41 on the exterior face that is compatible with and when pressed against the human body skin surface, firmly but releasably attaches the electrode to the skin. The attachment washer 40, usually formed of foamed spongy material, is secured encircling the body 37 by a back-up washer 42 secured to the back side of body 37. Thus, the back-up washer 42 is a plate-like disc which is secured against the back of body 37 and the washer 40 by a suitable adhesive 43. The rivet 39a is shown having an outer flanged cap 44 which also abuts and firmly clamps the adjacent portion of the back-up washer 42 in place. The cover 45 is shown as a disc-like plate or card somewhat larger than the support washer 40. Cover 45 is adhesively attached by a coating which may be readily peeled of from pad 40 for attachment of the latter to the body.

The saturated gel pad 36 must be protected until the electrode is used, and in the illustrated embodiment is sealed by a thin film cover 47 of suitable plastic. The cover 47 is preferably a low density polyethylene on the order of 9 mils thick to essentially prevent transmission of fluid into or from the pad, Thus, the gel pad cover 47 is sealed to the film-like coating 46 on card 45 by an annular seal 48 to establish a substantially fluid tight enclosure of the gel pad 36. The cover 47 is removed simultaneously with the removal of the cover 45. The enclosure for the gel-saturated pad 36 preferably at least approaches a hermetic seal to prolong the shelf-life of the final electrode unit. The described materials with the fusion bonding established by the present invention establish a unit having a significant commercial shelf life.

In the illustrated embodiment, the electrode unit is formed in a series of steps including the application of the foam pad 36 in the apparatus of FIGS. 8-9, the injection of the gel through the attached pad, and then the application of the protective cover 47 in an apparatus such as shown in FIG. 1.

The conveyor 4 is formed with appropriate recesses 49 to receive the cup-shaped body 37 with the contact 39a in place. Generally, the foam pad 36 is removed from a foam web 50 and moved by a tool unit 9 downwardly, with the pad 36 removed and sealed to the cup-shaped member 37 and particularly the flat top wall 38 by tool unit 9, generally as in the manner of the previous embodiments. The foam pad 36 is formed of polyurethane which is not severed by downward movement of the cutting edge of the tool element but only by the simultaneous heating of tool element 17.

In the embodiment of FIGS. 8 and 9, the tool unit 9 and particularly the tool element 17 is formed with a cup-shaped cutting and sealing member 51 having an appropriately shaped cutting end 52 and a mounting base portion 53. The cutting and sealing member 57 is connected by a bolt 53a which may be formed of stainless steel to a cooled heat sink member 54, which is suitably coupled to power cylinder unit, not shown. In this embodiment an additional annular clamp member 55 is shown secured as a part of the tool unit. The clamp member 55 is an annular member having a central mounting base portion 56 secured between the heat transfer member plate and the base of the member 57. An L-shaped extension from the mounting portion 56 terminates in an outwardly extending leg or flange 57 which is located outwardly of the tool unit 9 and in overlying relationship to the induction heating unit or coil assembly 13. The clamp member 55 is formed of a flexible but relatively firm rubber-like material or other like material, such as Kraton G 2705, manufactured and sold by Shell Chemical Company.

Induction heating assembly 13 of the second embodiment corresponds to that previously described except that an outer non-metallic cover or shell 58 is such as an acrylic plastic or any other suitable material, shown provided on ring 30 within which the coil 31 is embedded.

In operation, the tool unit 9 again moves downwardly with the induction heating coil assembly 13. In this embodiment, the annular flange 57 of the clamp member 55 moves downwardly onto the foam web 50 and forces the aligned web portion into engagement with the shell 58 of induction heating coil assembly 13. The flange 57 may force the heating coil assembly 13 downwardly against conveyor 4 and compress the foam web as at 58a, as shown in FIG. 9, and thereby grips the web about the cutting and sealing element 17. The separate cylinder 16 may then be eliminated.

The clamping engagement causes the deflection of the annular clamping member 55, as shown in FIG. 9. Backing ring or washers 59 are shown secured to the opposite faces of the mounting portion 56 of the clamp member 55 to provide a stop to the deflection of the leg 57. The backing ring 59 functions to increase the clamping force and thereby to compress and firmly clamp web 58a in place during the cutting and sealing operation. The clamp member 55 and associated washers 59 are formed of a non-metallic material to maintain the described heat transfer path to the member 54.

As the tool unit 9 moves downwardly into engagement with the clamped foam web 50, the edge 52 stretches the foam web 50 as at 59a in FIG. 9 and forces the aligned portion of the foam web 50 downwardly into engagement with the outer flat wall 38. When in engagement with wall 38, the induction heating assembly 13 is energized to inductively heat the tool element 17 which again functions to sever the foam pad 36 from the web 50 and simultaneously heats the wall 38 to the softening temperature, such that tool edge 52 moves into wall 38 to form the recess 37a therein. The periphery of the foam pad 36 is, of course, simultaneously forced into the recess 37a formed in the wall 38 by the pressurized force of tool unit 9 and thermally welded in place.

The tool unit 9, and particularly element 17, is held in the cutting and sealing position with the induction heating coil unit 13 energized for a suitable sealing period. After the sealing period, the induction heating coil unit 13 is deactivated and the tool unit 9 held in position for a controlled cooling period, during which the tool element 17 again rapidly cools as result of heat transfer through the base portion 53 and transfer bolt 53a to the cooled member 54. After a short period tool unit 9 is raised from the foam pad 36 and wall 38 to release the covered container or cup-shaped body 37. In the illustrated embodiment, the cutting and sealing member 51 is located within the outer leg 57 of the clamp member 55. Thus, as the tool unit 9 returns to the raised or standby position, the leg 57 tends to move the web 50 from the cutting and sealing member 51. This action would further assure complete separation of the web if there is any tendancy of the web to stick to the member 51.

When the foam pad 36 is severed from the foam web 50 and the assembly returned to the loading position of FIG. 8, the web 50 returns under the tension force to the horizontal plane, with the inner severed portion located immediately beneath the clamping member 55.

The heating coil assembly 13 moves upwardly with the tool unit 9 to allow the movement of the pad covered body 37 from the alignment with the tool unit. The tool unit 9 moves upwardly to the position of FIG. 8, thereby freeing the foam strip or web 50 for longitudinal movement thereof and alignment of a new portion within the cutting and sealing apparatus for a new cycle.

The pad-covered body 37 may then be immediately transferred to a station to insert the gel through the pad 36 and into the cavity of body 37, and then moved to a sealing station, such as shown in FIG. 1, to apply cover 47. The cover 47 may of course be applied in any other manner suitable for creating a hermetic-type enclosure of the gel-saturated pad 36.

This results in a simpler and less costly assembly. The more conventional electrode includes a means for securing the gel pad within a cavity in combination with a multiple layered cover, attachment and packaging assembly consisting of backing, sealing and outer protective elements. Generally a flanged cap is secured overlying the gel and filled cup and held in place abutting a back-up card by an adhesive coated label. Some care must be taken to ensure full area adhesion of the label to insure maintaining of the gel in a highly moist state and satisfactory function in a medical diagnostic environment. The multiple part assembly of the present invention with pressure sensitive adhesive layers results in substantial reduction in material and assembly costs. Clearly the cover 45 and 47 which may be applied with this invention is much smaller and lighter than the previous complex multiple layer assembly and is sealed to the card 45 without the use of expensive pressure sensitive coatings. Further, the new film-like cover 47 may conveniently be more transparent than the conventional cap and can produce a more attractive product. Testing on the cover 47 attached by a heat seal 48 has shown good retention of moisture and prevention of escape of the gel while realizing significant cost savings.

The method and apparatus of the invention described with the aid of FIGS. 8-9, inclusive, are thus used to simplify the structure and reduce the costs associated with the attachment of the gel-foam pad 36. The heat sealed foam pad 36, which is automatically cut from a web and heat sealed into a depression of the top face of the gel cup 37, as shown in FIGS. 8 and 8a, is retained in position to hold the gel 39 in the proper manner to make electrical contact without the need for any adhesive. Further, not only is the cost of the adhesive eliminated in the new procedure, but the adhesive is removed from the key area under the foam pad and minimizes possible interferences with the free flow of the gel when introduced into the foam pad and forcing the gel through the foam pad 35 through the total area of the cup portion. The automatic cutting and sealing in position by the tooling of this disclosure eliminates manual attention, thereby reducing manufacturing costs as well as simplifying the design of the product.

In summary, the present invention as shown incorporated in the embodiment of the invention of FIGS. 8-9 simplifies the manufacture and reduces the costs of both the electrode structure itself and the protective packaging. The apparatus and process considered with respect to FIGS. 8-9, inclusive, of this disclosure also permits the simplification of the design with elimination of the usual protective cap assembly and interconnected multiple layered pressure sensitive label and attachment means. Further, a cover such as cover 47 may be applied to a more conventionally assembled contact body and foam pad unit which is constructed with a suitable plastic covered attachment pad, or a supporting card.

Thus, the second embodiment is essentially similar to that of the first embodiment in providing for simultaneous cutting and sealing of a first element formed of plastic or other compatible material to a second element by a thermal or fusion bond.

The present invention, particularly with the controlled cooling of the tooling may also be advantageously applied to either cutting or shaping of elements, or the direct thermal sealing of preformed element to another. An embodiment of the invention for sealing of a preformed member to another member is illustrated in FIG. 10.

In this embodiment of the invention, a preformed hat-shaped cap 60 is adapted to be located over an article 60a. The cap includes a flange portion 60b thermally sealed and attached to a base member 61 using a tool unit 62. The modified tool unit 62 is generally similar to the previously described embodiments and includes a cooling plate and a tubular heat transfer element to which a specially shaped sealing foot 63 is secured. The sealing foot 63 is an annular L-shaped member defining a lateral enlargement. In this instance, the bottom wall of the foot is formed with a flat bottom to develop a seal of a particular width. The inner edge of the sealing foot is provided with a chamfered edge portion 64 to provide the desired seal width while locating of the working enlargement radially outwardly of the balance of the tool unit 62 and thereby locate the enlargement closely adjacent to the annular heating coil assembly 13.

In the illustrated embodiment of the invention, a holding ring 65 is secured within the heat transfer element 21. The holding ring 65 is generally a cup-shaped member having a base 66 interconnected to the cooling plate 23 by a suitable threaded stud 67. The ring 65 projects downwardly beyond the transfer member 21 but terminates inwardly of the outer sealing face of sealing foot 63. The holding ring 65 serves to locate and center the preformed cap 60 in position and simultaneously controls extrusion of the flange 60b under the clamping action of the tool element 17.

In the embodiment of FIG. 10, release of the tool element 17 from the sealed cap 60 is assisted by a spring loaded knockout pin 68 which is mounted coaxially within the threaded attachment stud 67. A spring member 69 within the stud 67 biases the knockout pin 68 outwardly. During the downward clamping movement, the pin 68 engages the top of the preformed cap 60 and spring 69 is compressed during the final movement of the tool unit 62 into the sealing position.

During the initial release of the tool unit, pin 68 is biased outwardly by the spring 69 to positively hold cap 60 in place, thereby assisting in the release of the holding ring 65 and the sealing foot 63 in the event there is any tendency for such elements to stick to the preformed cap. The holding ring 65 and pin 68 are preferably formed of material to minimize induction heating thereof.

The final result is an outer peripheral sealed portion 70 generally corresponding to the width of the sealing foot 63 and an inwardly located enlargement which is formed as at 71 by movement of the heat-softened plastic flange material upwardly around the holding ring 65. A practical application of the invention shown in FIG. 10 would be the attachment of the usual preformed cap of a body-contact electrode to the pad or gell filled cup of the prior art construction in place of the usual label with its pressure sensitive adhesive.

As in the previous embodiments, inductive heating of the tool unit 62 permits very accurate control of the heating, and not only of the level of heating but the sequence of heating. Further, the heat transfer element 21 and the associated cooling means provide the desired rapid controlled cooling of the inductively heated tool element upon the termination of the sealing cycle.

Figure 11:
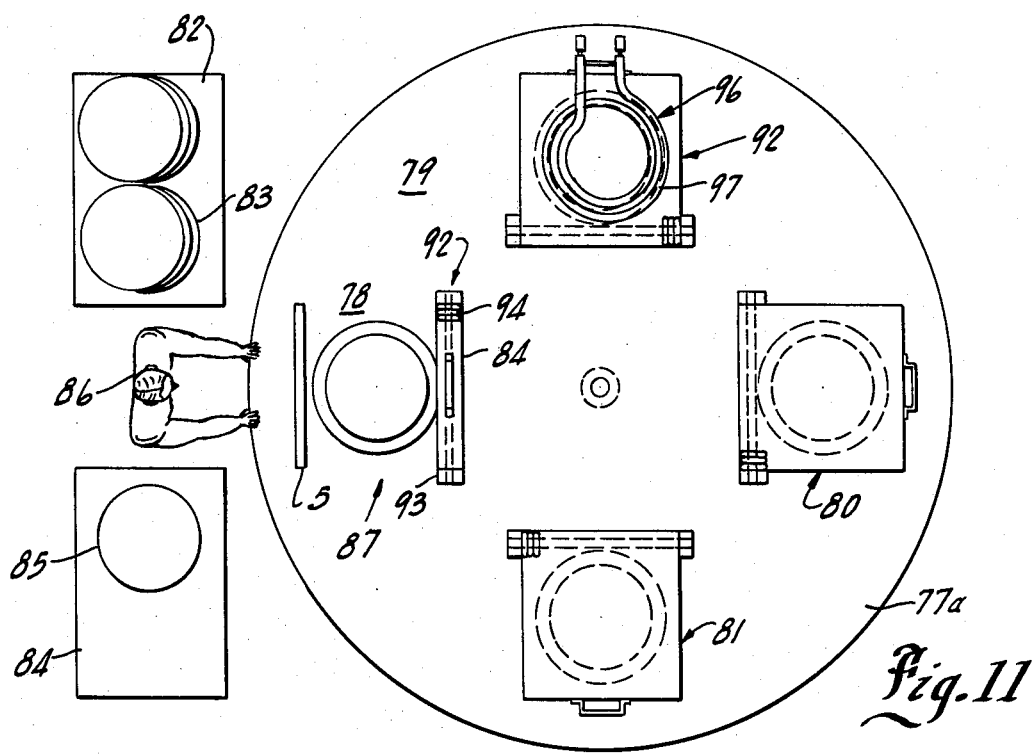
FIG. 11 is a plan view illustrating a multiple section apparatus for applying a flat film-like lid over an open container in combination with an over cap.
Figure 13:
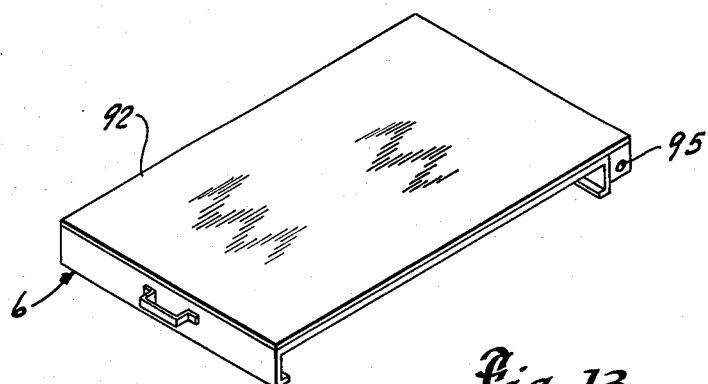
FIG. 13 is a pictorial view of a clamping element shown in FIGS. 11 and 12.
Figure 12:
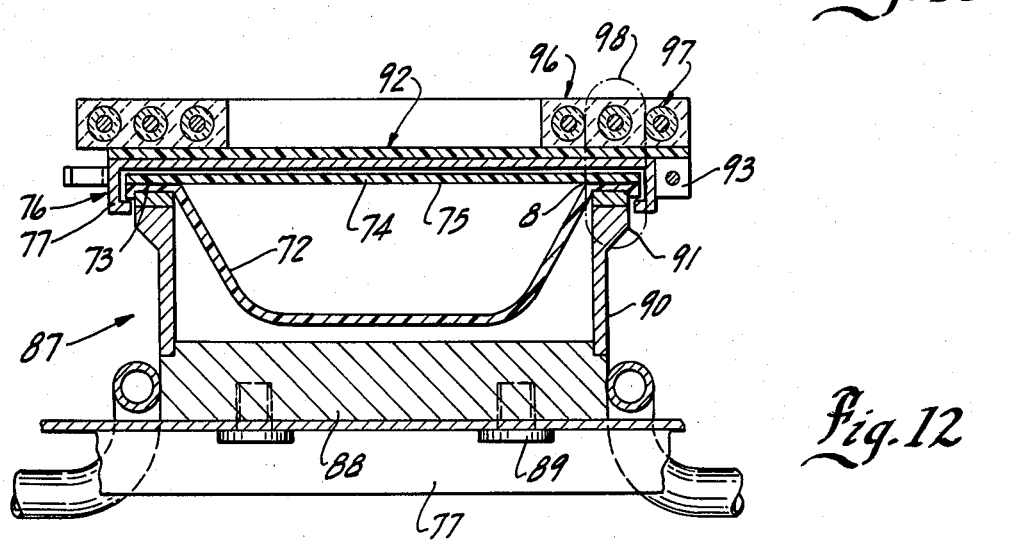
FIG. 12 is a vertical section through the apparatus of FIG. 12 at the lid sealing station.

Still a further embodiment of the invention is illustrated in FIGS. 11-13, wherein a cup-shaped plastic container 72 having an outer flange 73 is sealed by a sealing liner 74 which is fusion bonded to the flange 73. The sealing liner 74 is shown coated with an adhesive layer 75 formed of a suitable material which melts and bonds the adjacent flange 73 when properly heated. The liner may produce a hermetic closure of the container 72 for protecting the contained products from the surrounding environment and the like. Generally, in such a package, the liner 74 may be a relatively thin element which may be readily damaged or disrupted during handling, storage and the like. A plastic lid 76 of a relatively heavy supporting material is desirably provided. The illustrated lid 76 includes a downwardly projecting resilient lip 77 which snaps over the flange 73 to secure the lid 76 in protective overlying engagement to sealing liner 74. The covered container 72 is completed by thermally attaching the liner 74 in place.

As shown in FIG. 11, a turntable 77a which is adapted to rotate between a plurality of stations, is shown as four equicircumferentially spaced stations, including a loading and unloading station 78, a heating and sealing station 79, and a pair of cooling and final sealing stations 80 and 81. The station 78 is shown constructed for both loading of an unsealed container assembly and unloading of a sealed container assembly, and includes a table 82 having a supply of assembled container units 83 and an unloading table 84 for receiving of sealed container 85. An operator 86 inserts and removes the container, which may be a human operator or an automated machine operator.

The present invention is particularly directed to the construction of the inductive heating apparatus which is operable at station 79. In this embodiment of the invention, four separate tool units 87 are secured to the turntable unit in circumferentially spaced relation in accordance with the spacing of the several stations 78-81. The turntable 77a is indexed by a suitable stepped driving means, not shown, through steps of 90 degrees to sequentially transfer each of the tool units 87 to the next adjacent station. A dwell period is included to hold the tool units at the aligned station for a predetermined period sufficient to complete the maximum work requirement, and in particular to permit proper loading and unloading at station 78, proper heating to effect sealing of liner 74 to flange 73 at station 79 and cooling at the subsequent stations 80 and 81.

The liner attaching apparatus includes a tool unit 87 which is again inductively heated and separately cooled, As shown in FIG. 12, the tool unit 87 is an inverted tubular tool assembly which has a cooled plate 88 secured by bolts 89 or suitable means to fixedly attach the tool unit 87 to the turntable 77a.

A tubular heat transfer element 90 is secured to the cooling plate and projects upwardly therefrom. A heating ring 91 is secured to the outer end of the transfer element 90. The transfer element 90 and the heating ring 91 are formed of a generally similar diameter which is selected to locate the ring beneath flange 73 of the cup-shaped container 72. The container assembly with the lid 76 lightly holding the sealing liner 74 in position is mounted at loading station 78 within the tool unit 87, with flange 73 resting on the heating ring 91.

A pressure cap 92 is secured at the loading station 78 overlying the inserted capped container assembly to force and hold the sealing liner 74 and lid 76 in firm engagement with the outer surface of the flange 73 during the movement through the heating and sealing apparatus. In the illustrated embodiment of the invention, the pressure cap 92 is a thin non-metallic, flat member having an inner end pivotally mounted to turntable 77a to the inner side of the tool unit 87, as at 93. Cap 92 has a width slightly greater than the overcap and is provided with depending front and back walls spaced to appropriately hold the overcap 76 and therefor container 72 within and beneath the pressure cap 92. The pressure cap 92 is securely and releasably locked in the clamping position before the indexing to the station 79 by a suitable holding means, such as by spring loading of the pivot shaft as at 94. Other means may of course be used.

The heating and sealing station 79 includes a fixed induction coil unit 96 which may include a flat multiple turn coil 97 in a plane immediately above that of the loaded tool unit 87, and particularly immediately above the plane of the latched pressure cap 92. The coil unit 96 is of course connected to a suitable RF power supply, not shown, to establish a magnetic field 98 which passes downwardly through the pressure cap 92, the lid 76, the liner 74 and the flange 73 into and through the induction heating ring 91. The ferromagnetic ring reacts with the creation of induced eddy currents within the ring. The current generates ohmic and magnetic losses appearing as heat in the ring. After a few seconds depending upon the design, the excitation level and the like, the temperature of the ring rapidly rises to the softening temperature of the adhesive material 75 on the liner 74. As the result of the heat transfer from the heated ring 91 through the flange 73 directly into coating 75, the adhesive coating material melts. The flange 73 is clamped in place and is sufficiently thick that the heat transfer is readily accomplished without distortion of the flange as a result of the short heating period. The coil 97 is deenergized at the end of the heating period and tool unit 87 quickly cools as the heat dissipates through the transfer element 90 to the cooling plate 88. Correspondingly, the melted coating 75 of the lid 74 solidifies by heat transfer to the cooling ring.

As soon as the coil 97 is deenergized, the turntable 77a may be indexed to move the heated assembly to the first cooling station 80 while moving a newly loaded assembly 72 into alignment with the induction heating station 79. The proper timing of the assembly including the energization of the heating coil, the movement of the indexing table and the like, can of course be readily provided through any suitable automatic control means.

Although a cooled heat sink plate is shown in the several embodiments, other cooling means might be used. For example, a cooled fluid medium might be moved directly over the outer removed end of the heat transfer member, such as fan generated air, for controlling the heat transfer from the working or forming end of the tool element.

The illustrated embodiments are described with the use of induced current flow in the tool element creating heat as a result of magnetic and ohmic losses. Other induced reactions which might be usable by suitable selection of material and combinations, such as hysteresis losses, dielectric losses and the like as well as any other operable energy field. The terminology "inductive" heating and similar terminology is therefore used herein to generically define heating based on the creation of a changing high energy field which when coupled to a tool element of an appropriate material interacts to create heat within the element. Although within the broadest aspect of the preferred multi part tool, direct energization such as direct conductive connection of an electric power or even thermal power to the working end portion of the tool element might be used, such heat source is not considered as useful as the inductive heating which permits rapid, effective control of the concentration of the heat within the working or forming end portion of the tool element, as disclosed in the preferred embodiments of the invention.

The present invention particularly in the preferred embodiments, provides a reliable, rapid and effective means of working plastic members, and particularly for cutting, forming and sealing in a simultaneous single tool operation.

Various modes in carrying out the invention are contemplated as being within the scope of the following claims, particularly pointing out and distinctly claiming the subject matter which is regarded as the invention.

We claim:

1. An inductively heated apparatus for working plastic material, comprising
    a tool unit having a tool element formed of a material responsive to a selected energy field to generate heat in the tool element,
    a heat source coupling unit mounted adjacent the tool element and generating said energy field coupled to said tool element to create heat within the tool element and thereby raise the temperature of said tool element to the fusion temperature of the plastic, and
    a cooling means thermally coupled to said tool element to establish selective forced cooling of the tool element.

2. The apparatus of claim 1 wherein said tool element is a tubular member operable to remove a plastic element from a sheet of plastic and including a heating control means operable to actuate said coupling unit with the tool element in a sealing position and thereby simultaneously sever and seal said plastic element in place.

3. The inductively heated apparatus of claim 1 wherein said tool element includes a tubular forming end portion, said coupling unit includes a coupling plate having an opening aligned with said tubular forming end portion and sized to allow spaced relative movement over said forming end portion, and having means to establish relative movement between said tool element and coupling plate and to establish corresponding movement between said tool element and said coupling plate.

4. The inductively heated apparatus of claim 1 wherein said tool element includes a tubular forming end portion, said cooling means includes a heat transfer member formed of a material which is substantially non-responsive to said energy field and a cooled heat sink connected to said heat transfer member, means to move said tool element to move said forming end between a standby position and a forming position, and said heat source unit including a coupling member moved relative to and in timed relation to said forming end portion for aligned movement with said end portion tool element and for movement from and to said aligned position.

5. The inductively heated apparatus of claim 4 wherein said coupling member includes a coupling plate having an opening aligned with said tubular forming end portion and sized to allow spaced relative movement over said forming end portion, means to establish relative movement between said tool element and coupling plate and to establish corresponding movement between said tool element and said coupling plate.

6. The inductively heated apparatus of claim 4 or 5 including means to support a plastic member between said coupling plate and said tubular forming end portion.

7. The inductively heated apparatus of claim 4 including means to support a plastic web overlying and extending outwardly of said tubular forming end portion, said plastic web having a limited elasticity, means to establish relative movement of said tool element and said web to move said end portion into stretching engagement with said web and then through said plastic web to remove a severed portion corresponding to the configuration of said tubular forming end portion.

8. The inductively heated apparatus of claim 7 wherein said tool element defines an inverted cup-shaped enclosure overlying said severed portion to create a heated chamber overlying said severed portion.

9. The inductively heated apparatus of claim 1 wherein said cooling means includes a heat transfer member connected to said tool element and extending therefrom, and a forced cooling means connected to the outer end portion of said heat transfer member.

10. The inductively heated apparatus of claim 9 wherein said tool element includes a magnetic material responsive to said energy field to generate heat, said transfer member is formed of a material having a minimum electrical resistance, and said forced cooling means includes a cooled heat sink formed of a material of less thermal conductivity and less responsive to said energy field than said tool element.

11. The apparatus of claim 10 wherein said transfer member is copper and said heat sink is a stainless steel member.

12. The inductively heated apparatus of claim 1 wherein said tool element includes a tubular support body and a tubular sealing end, a tubular clamp member located within the support body and operable to move therewith to locate the end of the clamp member adjacent the plastic element and thereby restrict the displacement of plastic into the tool element.

13. An inductively heated work apparatus for working a plastic member comprising,
 a tool element formed of a material heated substantially to the melting temperature of the plastic member in response to a changing energy field applied to the material, said tool element being formed with a support body and an outer circular working end portion extended laterally outwardly of the support body,
 a thermal conductor means having a substantially greater thermal coefficient than said tool element and connected to said support body for conducting thermal energy from the tool element, and
 a thermal sink means coupled to said thermal conductor means for absorbing thermal energy therefrom and establishing controlled heat transfer from the tool element.

14. The inductively heated apparatus of claim 13 wherein said working end includes an end face having a cutting end edge with offset adjacent end surfaces, said cutting edge being adapted to thermally sever a plastic film and simultaneously change the aligned portion of the plastic film to a fusion state.

15. The inductively heated apparatus of claim 13 wherein said working end includes an outer flat end face for developing an extended surface engagement with the plastic.

16. The heated work apparatus of claim 13 wherein said tool element has a relatively narrow cross-sectional thickness whereby the heating is established substantially throughout the tool element, said thermal conductor means has a relatively narrow cross-sectional thickness and said sink means is a relatively heavy plate-like member including means to force cool the plate-like member.

17. An inductively heated apparatus for sealing a thin liner having a thermally activated sealing surface to the flange of a container, comprising
 a tool unit having a tubular tool element having a top substantially flat working end face adapted to be aligned with said flange and formed of a material responsive to an energy field to generate heat in the sealing element,
 an inductive heating coil unit coupled to said tool unit for activating said tool element to create heat within the tool element and thereby raise the temperature to the bonding temperature of the liner,
 a cooling means coupled to said tool element to establish selective forced cooling of the tool element, and means to clamp said liner to said flange.

18. The apparatus of claim 17 wherein said coil unit is a flat multiple turn coil located in spaced relation to said tool element, and including means to establish relative lateral motion to align said coil unit in overlying relation to said liner and container assembly.

19. An inductively heated plastic cutting and sealing apparatus for securing a foamed plastic cover to a second member, comprising means to support a web of the foamed plastic defining a web portion from which a plastic cover is to be formed,
 a support means aligned with said web portion and adapted to hold the second member in alignment to said cover,
 a tubular tool unit movable relative to said web portion and operable to forcibly engage said web portion and the end of said second member,
 means to fixedly support the web about the tool unit, and
 inductive heating means coupled to said tool unit and generating an energy field to inductively heat said tool unit to the fusion temperature of the plastic of said web whereby said tool unit holds the cover in engagement with said second member and said tool unit severs said foamed cover from said web portion and thermally bonds the cover to the second member.

20. The apparatus of claim 19 including a heating control means operable to actuate said heating means with the tool unit in a sealing position against said web to thereby simultaneously sever and seal the plastic cover to the second member.

21. The apparatus of claim 19 wherein said inductive heating means includes a tubular heating plate having an opening aligned with the tool unit, means for relatively moving the heating plate and tool unit to locate the tool unit within said opening and spaced from said opening, and means to support said web portion between said tool unit and said heating plate.

22. The apparatus of claim 19 or 21 wherein said tool unit includes
 an annular tool element formed of a material heated in response to said field,
 a thermal conductor means connected to said tool element for conducting thermal energy from the tool element, and
 a cooling means coupled to said thermal conductor means for absorbing thermal energy therefrom and establishing controlled heat transfer from the tool element.

23. The inductively heated plastic working apparatus of claim 22 wherein said web support means holds said web to the opposite sides of the tool unit and whereby said tool unit is adapted to stretch said web to place said exposed web portion in tension to produce a pressurized engagement of said film portion and said tool unit.

24. An inductively heated plastic working apparatus for applying a film element to a base member,
 comprising web support means to support an elongated web of the plastic defining an exposed web portion from which a film element is to be formed,
 a support means aligned with said exposed web portion and operable to support a base member,
 a tool unit constructed and located to establish a forcible engagement with said exposed web portion and operable to force and hold said web portion into engagement with said support means,
 means to establish relative movement between said tool unit and said support means to establish said forcible engagement, and
 inductive heating means coupled to said tool unit to inductively heat said tool unit to the fusion temperature of said film and said base member while said tool unit and film are in said forcible engagement whereby said tool unit changes the aligned portion of the film element to molten fusion state and severs said film element from said film.

25. The plastic working apparatus of claim 24 wherein said inductive heating means includes a coupling plate movable relative to said tool unit whereby said web is movable between said tool unit and said coupling plate.

26. The inductively heated apparatus of claim 24 wherein said tool unit includes an annular tool element formed of a material responsive to an electromagnetic field to generate heat within the tool element,
  and said inductive heating means includes a radio frequency coil assembly encircling said tool element for activating said tool element to create heat within the tool element and thereby raise the temperature to the fusion temperature of the plastic web, and
  a cooling means thermally coupled to said tool element to establish selective forced cooling of the tool element.

27. The heating apparatus of claim 24 including control means operable to energize said inductive heating means to establish a steady state temperature below the fusion temperature and operable to rapidly increase the temperature to at least the fusion temperature, and including timing means to control the energization of said inductive heating means in and to said different states.

28. A method of forming and sealing a plastic element to a second element, comprising supporting a web of plastic material from which said plastic element is to e formed in tension and in spaced relation to said second element, moving a tubular cutting tool means having a cutting edge member into engagement with said web with a perpendicular component of motion to stretch the plastic web and force the engaged portion of the web from the plane of said web and through said spaced relation and into sealing engagement position with said second element, said plastic material being sufficiently elastic to permit said stretching during the movement into said sealing engagement, and heating said cutting edge member to thermally sever the stretched plastic element from the web and to heat seal the plastic element to the second element, said elasticity of said elastic material returning the web to the original plane after said severing of the plastic element therefrom, said cutting edge member holding the plastic element in engagement with said second element, and further including the step of forced cooling of said cutting edge with said cutting edge holding the plastic element.

29. The method of claim 28 including the step of forced cooling the tooling means below the fusion temperature prior to separating the tool means from the sealed plastic element to promote a clean separation thereof.

30. The method of claim 28 including the step of cooling said tool means while in said sealing engagement position to the temperature below the fusing temperature of the plastic material, and then removing the tool means from said plastic element.

* * * * *

UNITED STATES PATENT AND TRADEMARK OFFICE
CERTIFICATE OF CORRECTION

PATENT NO. : 4,380,484
DATED : April 19, 1983
INVENTOR(S) : Clyde P. Repik and Alfred F. Leatherman It is certified that error appears in the above-identified patent and that said Letters Patent is hereby corrected as shown below:

Column 1, Line 41, Cancel "in" and substitute therefor ---is---

Column 2, Line 41, Cancel "specifically" and substitute therefor---specially---

Column 7, Line 67, Cancel "th" and substitute therefor ---the--- (second occurrence)

Column 12, Line 42, After "thereby" insert---firmly---

Column 21, Line 31, Cancel "e" and substitute therefor ---be---

Signed and Sealed this

Thirteenth Day of March 1984

[SEAL]

Attest:

GERALD J. MOSSINGHOFF

Attesting Officer

Commissioner of Patents and Trademarks